United States Patent [19]

Wright

[11] Patent Number: 4,837,708
[45] Date of Patent: Jun. 6, 1989

[54] PROCESS AND APPARATUS FOR DETERMINING FLOW RATE OF A FLOW MEDIUM IN A FLOW LINE

[75] Inventor: Terence Wright, Caracas, Venezuela

[73] Assignee: Maraven, S.A., Caracas, Venezuela

[21] Appl. No.: 68,839

[22] Filed: Jul. 1, 1987

[51] Int. Cl.⁴ .................. G06F 15/64; G06F 15/66; G06F 7/56

[52] U.S. Cl. .................. 364/509; 364/510; 364/550; 364/558; 382/28; 358/107

[58] Field of Search .......... 364/510, 509, 550, 556, 364/558, 518, 520; 382/6, 18, 29, 28; 346/49; 73/861.05; 358/96, 101, 107; 340/870.02, 870.05

[56] References Cited

U.S. PATENT DOCUMENTS

| | | | |
|---|---|---|---|
| 1,877,810 | 9/1932 | Chamberlain | 137/486 |
| 2,611,812 | 9/1952 | Hornfeck | 340/870.05 |
| 3,322,339 | 5/1967 | Nolte | 241/145 |
| 3,742,515 | 6/1973 | Yeiser | 346/49 |
| 3,980,865 | 9/1976 | Messer et al. | 365/510 |
| 4,414,634 | 11/1983 | Louis et al. | 364/510 |

FOREIGN PATENT DOCUMENTS

| | | | |
|---|---|---|---|
| 1547959 | 7/1979 | United Kingdom | 382/1 |
| 1549722 | 8/1979 | United Kingdom | 382/1 |

Primary Examiner—Parshotam S. Lall
Assistant Examiner—E. B. Ramirez
Attorney, Agent, or Firm—Bachman & LaPointe

[57] ABSTRACT

The present invention relates to a process and system for continuously monitoring and calculating the flow rate of a fluid medium in a flow line. The system includes a camera for viewing and capturing an image of a chart having different colored trace lines representing manometric pressure upstream of an orifice in a plate in the flow line and differential pressure across the orifice plate, a color filter for creating a modified image of the chart, an electronic digitizer for digitizing the images, and a microprocessor for determining the fluid flow rate from the captured and/or modified images. The system also includes monitors for displaying any of the iamges and manually operated devices for editing the images and for providing the microprocessor with instructions.

24 Claims, 1 Drawing Sheet

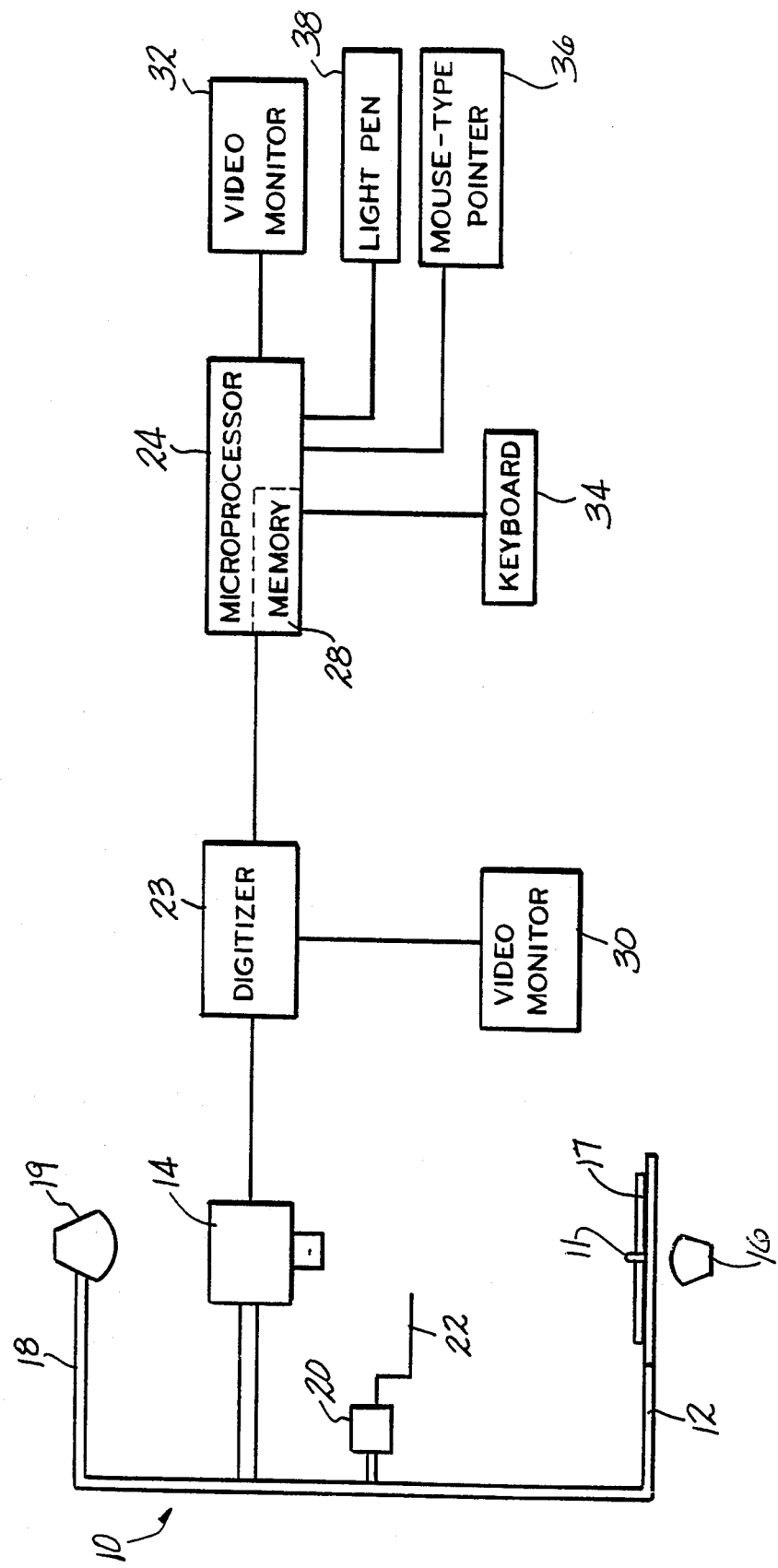

PROCESS AND APPARATUS FOR DETERMINING FLOW RATE OF A FLOW MEDIUM IN A FLOW LINE

BACKGROUND OF THE INVENTION

The present invention is drawn to a process and apparatus for continuously monitoring and calculating the flow rate of a fluid medium in a flow line where a chart recorder is used as part of the monitoring process and more particularly, to a process and apparatus for continuously monitoring and interpreting the traces produced by a chart recorder to determine gas flow rate.

Chart recorders have been used for many years in numerous industries for recording the measurements of physical quantities, as in the extensive use by the petroleum and chemical industries for determining the flow rates of fluids, particularly gases, in order to determine consumption and to serve as a visible record and evidence of said consumption, particularly when the fluid or gas is a commercial product provided by a supplier to a consumer. The traditional method of determining flow is by computation from determinations of the gauge pressure of the gas and the differential pressure across an orifice plate inserted into the flow line. Since the flows are usually required to be measured continuously and often in remote areas, simple pre-calibrated automatic circular chart recorders are usually used to register the gauge and differential pressure components as traces on a removable chart. By measuring atmospheric pressure or determining its value from knowledge of the ambient temperature and the altitude at which the measurements are made, the absolute pressure of the gas can be derived. The flow is then determined from the product of the calibration constant of the orifice times the magnitude of the square root of the product of the absolute pressure and the differential pressure. For strict accuracy in calculations, the square root of the cross-product of the two dynamic pressure variables must be continuously integrated over time. For lack of simple, economic and automatic methods of performing the correct calculation, it has been common practice to independently integrate and thus average the two pressure variables over time and to then extract the square root of the product of these averages.

In the prior art, there are many different types of mechanical integrators for the postprocessing of charts including wheel and disc multipliers used by human operators and various types of cams for determining square roots. A number of different chart conditions can increase the degree of difficulty in obtaining an accurate chart reading. For example, some charts show a solid, wide band where the chart pen has oscillated back and forth rapidly relative to the slow rotation of the chart over day-long periods. The human chart interpreter often has to make a guess as to where the pen was located for the majority of the time, in effect applying an unwarranted averaging process. Another type of chart that is very difficult to read manually is that having a sun-burst trace where there are about one hundred strongly-curved excursions of very large amplitude. Such traces are extremely hard to retrace on a moving platform with any pantograph or curve-following mechanism.

Other devices are known that essentially modify the basic chart recorder itself to perform the calculations by acting as a planimeter or by electronically computing and recording the results on the chart. The problem with these more complicated devices is that one is required at each and every monitoring site. This can range from several score to many thousands of devices per user organization.

U.S. Pat. Nos. 1,877,810 and 2,611,812 exemplify gas flow recording devices which utilize variable inductances or movable core transformers responsive to fluid pressure to generate an electrical signal and another similar inductance device, usually at a remote location for a remote recorder, to reconvert the electrical signal to a mechanical movement so as to move a recording pen on a rotatable chart. Although these patents disclose a remote recording instrument, they fail to solve the problem of how to accurately read and/or interpret the chart and determine flow rate therefrom. In addition, these systems are cumbersome to use because additional equipment must be provided at each and every flow measurement location and at each and every recorder location. Further, appropriate signalling systems must be provided between each measurement device and each recorder.

Another prior art system is shown in U.S. Pat. No. 3,322,339 wherein the mechanical system is physically connected to the chart recorder and mechanically acts as a planimeter to calculate the area under the curves, thus eliminating the need for a manual operator to trace over the curve on the chart. This mechanical system places an extra load on the movement of the pen, which could cause inaccuracies due to the extra loading. Also, it has many moving parts, and lost motion at the pivot points could cause further inaccuracies.

U.S. Pat. No. 3,742,515 discloses an analyzer for a chart recorder which utilizes electrical signals to produce a triangular wave traced along the edge of the recording chart, with each excursion representing a particular amount of area of integration of the amplitude of the analog signal. This analyzer does not however obtain an electrical signal showing the total quantity of fluid flow, nor even rate of fluid flow. Further, there are no means for interpreting the resulting charts other than manually.

U.S. Pat. No. 3,980,865 provides an electronic integrator for use in conjunction with a mechanical apparatus for transcribing the traces of pressure and differential pressure on circular flow charts. The electronic integrator, by proper encoding of the rotation of the chart table and of the two angular motions of the two pen arms, provides a running integral of the flow. Operation of this device requires an operator to simultaneously guide two pointers over two traces on the rotating gas chart, using one mechanical control lever in each hand to control each pointer, while at the same time the integrator performs the desired computations. Since both hands are occupied, the operator cannot easily disengage operation if the traces are incomplete. The device also relies on the dexterity of the operator for accuracy. Other disadvantages associated with this device includes (1) operator difficulty in accurately and simultaneously tracking two traces on a rotating table; (2) operation only in accordance with predetermined operations selected by a control panel; and (3) slow driving speeds to enable the operator to process charts with high-frequency trace displacements.

Finally, U.S. Pat. No. 4,414,634 relates to a data totalizer for fluid flow which is electronically calculated and directly connected to a chart recorder. The data totalizer includes first and second linear variable displacement transformers, with linkage connected directly in the chart recorder to move in accordance with movements of a plurality of marker pens and connected to move the linearly displaceable elements in the two transformers. An electronic multiplier is provided to multiply together the electrical outputs of the first and second transformers to obtain a product. An electronic circuit is provided to calculate the square root of such product to obtain an electrical signal proportional to the rate of fluid flow. This signal may be multiplied by a time signal to obtain the total quantity of fluid flow.

While the foregoing U.S. patents represent improvements in the state of the art, there are a number of differences vis-a-vis the present invention. For example, the devices accomplish the improvement either by the addition of the described devices to existing chart recorders or by proposing an improved chart recorder of greater complexity thus increasing the quantity of equipment at each flow monitoring point without providing the ability to retain measurements other than graphically. In particular, they do not show how to continuously monitor chart recorders and accurately compute pressures and integrate flows over time.

Accordingly, it is a principal object of the present invention to provide a process and system for continuously monitoring and calculating fluid flow rate in a flow line.

It is a further object of the present invention to provide a process and system as above which is rapid, highly automated, and highly accurate.

It is a particular object of the invention to provide a process and system as set forth above which includes a video monitoring of a plurality of trace lines on a flow chart recorder.

It is yet a further object of the present invention to provide a process and system as set forth above which automatically interprets the trace lines on the flow chart recorder and determines therefrom the manometric pressure and differential pressure for calculating the fluid flow rate.

These and other objects and advantages will become more apparent from the following description and drawings.

SUMMARY OF THE INVENTION

In accordance with the present invention, the foregoing objects and advantages are readily obtained.

The present invention is drawn to a process and apparatus for continuously monitoring and calculating the flow rate of a fluid medium in a flow line and, more particularly, the automatic monitoring of gas flow recorder charts and calculation of fluid flow rates therefrom.

The process of the present invention for continuously monitoring and calculating the flow rate of a fluid medium in a flow line having an orifice plate positioned therein broadly comprises transcribing a first trace line representing manometric pressure upstream of the orifice plate and a second line representing differential pressure across the orifice plate on a chart, such as a circular chart, associated with a recording device; optically scanning the trace lines and the chart with a video camera and capturing a first image of the lines and the chart; digitizing the image using an electronic digitizer; and using a microprocessor to determine the fluid flow rate from the digitized image, a modified version of the digitized image or an image derived from the digitized and/or modified image. In a preferred embodiment, the trace lines are of different colors, red and blue, respectively.

The system of the present invention also includes means for altering either the intensity of or the apparent color of one or more of the trace lines to create a modified image which can be used to form a derived image to be used in the determination of the fluid flow rate. In a preferred embodiment, the altering means comprises a color filter which can be interposed between the video camera and the chart. The system also includes means for editing the first, modified, and/or derived images to eliminate undesired portions; means for displaying any of the images; and means for storing and retrieving the digitized images.

BRIEF DESCRIPTION OF THE DRAWING

A better understanding of the principles and details of the present invention will be evident from the following description with the aid of the FIGURE which is a schematic diagram illustrating the present invention.

DETAILED DESCRIPTION

The present invention is drawn to a process and apparatus for continuously monitoring and calculating the flow rate of a fluid medium in a flow line and, more particularly, the automatic monitoring of gas flow recorder charts and calculation of fluid flow rates therefrom in a fast and precise manner.

The process and apparatus of the present invention in its preferred embodiment is used to continuously monitor and calculate the flow rate of a fluid medium, particularly gas, in a flow line having an orifice plate wherein a chart flow recorder transcribes a first trace line having a first color (for example, red) representing the manometric pressure upstream of the orifice in the plate and a second trace line having a second color (for example, blue) representing the differential pressure across the orifice.

In general, the process and integrated system of the present invention comprises capturing a first image of the traces on a circular chart using a monochromatic video camera. The captured image is digitized using an electronic digitizer and stored in a microprocessor memory. The microprocessor is also used to explore, transform, calculate and produce the appropriate result or measurement for the evaluated chart.

The detailed operation of the integrated system will be described hereinbelow with reference to the FIGURE.

The system includes a stand 10 having a base 12 with a centrally located pin 11 for fixing a chart 17 thereto and means for supporting a video camera 14. The stand also has a transmission light 16 positioned beneath the base 12 to illuminate the chart 17 positioned on the base, an arm 18 for supporting a reflective light 19 above the camera 14, and an electromechanical unit 20 for permitting a filter 22 such as a color filter to be interposed between the camera 14 and the chart 17. The color filter is used to reduce the contrast between the background of the chart and a trace line of the same color as the filter so as to essentially remove this trace line from the resulting image. Suitable means not shown may be provided to adjust the intensity of the light given off by the lights 16 and 19.

The camera 14 is preferably a monochromatic video camera because such a camera has a higher spacial resolution than a color video camera. It scans the illuminated chart, substantially continuously, and captures images of the traces on the chart. The camera 14 may be fitted with an adjustable lens system and an aperture diaphragm, both not shown, to correctly focus and adjust the quantity of received light.

An electronic digitizer 23 receives a signal of the image(s) captured by the camera 14 and translates the images into machine readable format. The digitizer 23 may comprise any suitable device known in the art having appropriate circuitry for converting each image into a digital matrix representing two dimensions in cartesian coordinates containing values representing measurements by the camera of relative light intensities over its field of view. The digitized image(s) may be transferred from the digitizer memory 23 to the memory of a microprocessor 24. A first video display monitor 30 linked to the digitizer 23 is used to display the image(s) being received from the camera 14 or stored in the memory of the digitizer 23.

The microprocessor 24 may comprise any suitable computer known in the art and may be provided with appropriate modules or cards and/or suitable programming for performing a variety of functions and operations. For example, the microprocessor 24 may be used to send a control signal to the electromechanical unit 20 for interposing the filter 22 between the camera 14 and the chart 17 and thereby generating a modified image of the trace lines. The microprocessor 24 can also be used to generate a number of derived images each of which contains a representation of a different one of the traces, through interpretation of the color, shades, and/or light intensities associated with the captured images and by the use of mathematical and/or logical operations such as partition, intersection, comparison, addition, subtraction, correlation and/or multiplication.

Prior to using the system 10 to monitor the charts, it is generally desirable to calibrate the system in order to correctly position the camera 14 with respect to the viewing base 12. The calibration operation comprises focusing and positioning the camera 14 in three normal directions with respect to the plane of the viewing base 12 and a single point of reference on the base, normally the intersection of the base plane with the axis of the centrally located pin (11). The single reference point forms the origin of three rectangular spatial cartesian coordinates.

Calibration may be carried out by placing on the base a reference source, such as a blank test chart of light color and of the largest size to be processed, upon which has been carefully scribed a fine dark trace corresponding in position to the maximum expressable value on the chart. In the case of a circular chart, the fine dark trace is a circle concentric with the chart scale origin of coordinates and with the radius of the maximum permitted pen excursion representing one hundred percent of full scale value. After the camera has taken an image of the test chart and the digitizer 23 has digitized the image, the microprocessor 24 compares it with its internal coordinate space and informs the operator how to move the camera in those directions that result in placing the camera at the correct separation from the plane of the chart and centralized over the selected origin of coordinates.

Alternatively, calibration may be performed by displaying on the video monitor 30 both a view of the test chart and an internally generated image of a line at the expected location of the line representing full scale. The operator then manually adjusts the camera position in the three possible dimensions so that the image of the full scale line is co-linear with the generated image.

The microprocessor 24 may of course be provided with suitable programming and/or a calibration module for performing either or both of the abovementioned calibration techniques. Once calibrated, there exists an accurately known linear relationship between the real separation of two points in each of two normal cartesian coordinate axes on a real subject chart and a calculated separation of images of the same two points in the digitized image chart. Information received by the microprocessor 24 from the calibration process can be stored and used to normalize intensity values of images from subject charts by subtracting the test chart image therefrom. The calibration process also facilitates computations and permits the use of different camera lens systems as well as adjustments for anticipated changes over time in the location of the camera and the size and shape of its viewing area.

Experience has shown that often the quality of illumination of the chart is inhomogeneous and uncorrectable by physical adjustments of the light sources 16 and 19. An additional initial step may be performed to compensate for this. This step comprises capturing and digitizing an image of a blank chart, typically the reverse side of a chart. The digitized image contains reference intensity values of the quantity of light impingent on each point of a typical chart. If desired, this image may be automatically subtracted by the microprocessor from each further digitized image in order to normalize the measured intensity values.

After completion of the initial setup and calibration steps, a subject chart containing a first trace line, usually red in color, representative of the manometric pressure upstream of the orifice in the plate and a second trace line, usually blue in color, representative of the differential pressure across the orifice is placed on the base 12. The image of the trace lines on the subject chart is then evaluated by the video camera 14. Preferably, repetitive analog images of the chart are produced by viewing the chart substantially continuously with the camera. The repetition frequency of a video camera is typically thirty times per second.

After the image captured by the camera 14 has been digitized by the digitizer 23 and stored in the microprocessor memory 28 and/or displayed on the video monitor 30, the operator selects one of several available strategies in order to determine the flow rate of the fluid medium in the flow line. The available strategies include: (1) spatial separation of non-intersecting traces in a single image; (2) separation by partition of intensities in a single image with reference to an intensity intermediate between those typical of one trace and those typical of the second trace; (3) separation by comparison of two images, one containing both traces compared to one containing only one trace due to an adjustment in camera sensitivity so as to distinguish only one of the traces from the background; and (4) separation by comparison of two images, one containing both traces compared with one containing only one trace due to having interposed a color filter having the same color as one of the traces such, as a red filter, to eliminate that trace from the second image. Depending upon the strategy selected by the operator, the microprocessor 24 executes a series of mathematical and/or logical operations needed to perform the selected strategy, for example, capturing one or more images, interposing the color filter between the chart and the camera, or in the case of spatial separation, requesting the operator to indicate on a monitor 32 with a manually-operated device a point on an imaginary circle for spatial separation or to identify which of the two spatially separated traces pertains to a particular pressure measurement. The manually-operated device may comprise a conventional mouse-type pointer 36 or a light pen 38. A light pen is particularly useful because it is very simple for the operator to trace a complete closed locus of separation on the display screen for the microprocessor to use in partitioning the image field along the two traces.

If desired, the operator may elect a manual mode for performing the available strategies. In this mode, a keyboard 34 is used to issue instructions to perform the selected strategy. Normally, the manual mode would be used if the subject chart is dirty, or the ink of a recording pen has spilled or dribbled on the chart, or the chart is to be reprocessed after annotations or scales have been placed upon the chart.

The manual operating devices 34, 36 and 38 can also be used to edit images displayed by the microcomputer on the monitor 32. Image editing permits elimination of traces, spots, smudges, or the like from the digitized image. Editing can be done by using the mouse type pointer 36 or the light pen 38 to indicate a reference point on the display screen corresponding to a particular point of the image. The operator then selects whether all the features or only those of a particular color are to be eliminated. In addition, the operator selects the nature of the elimination from a number of available operations such as: elimination of all selected feature types external to a circle of an indicated radius; elimination of all selected feature types internal to a circle of an indicated radius; all selected feature types within a square centered on the indicated image point; or just the selected feature types at the indicated image point. In the case of radial erasure the editing operation stops after the erasure, has been performed. In the case of puntual erasure, the editing operation is repeated at the selected point every time the mouse type pointer control button is pushed or the light pen touches the screen.

The operator in the manual mode is also able to adjust the diaphragm (not shown) of the lens system, the contrast provided by the video camera, and via the microprocessor 24, the parameters of the digitizing circuitry that enable the microprocessor to automatically assign "false colors" to particular trace intensities when displaying the digitized image. In this way, the operator can manually determine difficult situations of chart quality, provide additional biases, and by observing the display interpretation, control the results of the operation. Also, the operator can request that the filter be interposed or removed depending on the strategy being employed to obtain one or more different digitized and edited images. The main difference between the automatic and manual modes is that in the manual mode the microprocessor pauses between steps to allow adjustment of external and internal parameters.

As previously discussed, there are four available strategies which can be employed to obtain the two trace images needed to determine the gas flow rate. When the spatial separation strategy is selected, a copy is made of the first and only image of the subject chart containing the two trace lines. Thereafter, a second image is created in which the area external to a given locus of separation is removed from the image and thus leaving ony a selected internal trace and a third image is created in which the area internal to the same locus is removed leaving a selected external trace.

When the gray-scale intensity partition strategy is selected, a histogram of intensity occurrences is computed for the subject chart image. Thereafter the microprocessor 24 determines the two peaks of the bimodal distribution and a value midway between the peaks to be used as the value for partitioning the image into two new images, a first new image with values darker than the reference value and a second new image with values lighter than the reference value. The computer then proceeds to discard from the second new image points with values much lighter than the value of the lower peak, and in addition, all points in the second new image whose positions are directly adjacent to dark positions in the first new image, on the assumption that they represent partial capture only of the dark trace.

When either of the two strategies that obtain two different initial images, one containing the two traces on the subject chart and the other containing only the image of the trace of one color, are employed, then one of the newly-generated images corresponds to a copy of the image with the single trace and the other is generated by treating all intensity values as being either true (present) or false (absent) with reference to a marginal intensity. Thereafter, a point-wise logical intersection between the two-trace image and the logical inverse of the one-trace image is performed by the microprocessor 24 to produce another new image which contains only those features not common to the two original images; that is, the trace of the color not present in the single trace image. Any points in the resulting new image that have positions adjacent to points in the original one-trace image are then discarded as being caused by the two original images having different average intensities prior to the logical operation upon the images.

In each of the four above strategies, unless the operator intervenes to interchange the assignments, the resulting image trace measured as being darker is assumed to be "blue" or differential pressure and the lighter image trace is assumed to be "red" or manometric pressure. The measured relative intensities permit the system to make the assignment automatically.

Once the two final images obtained by the above strategies are stored, they are processed by the microprocessor 24 using known mathematical techniques to determine a gas flow rate. The first part of this process comprises the conversion from the image's quasi-polar coordinates to cartesian coordinates of value versus time. This transformation is done by applying two trignometric formulae and using pre-calculated trignometric tables and known chart constants such as zero and full scale radii and pen arm length. As the coordinates of each point in each image are transformed, the system produces four time vectors of information, two for the "red" or manometric pressure traces and two for the "blue" or differential pressure traces. For each vector, the position of the value indicates the time interval to which the value corresponds with reference to the upper vertical axis of the video camera at the zero hour angle. The two associated vectors for each trace color or pressure type contain respectively for each time-angle line, to the resolution desired, the sum of the values of pressure encountered along that time-angle line, and the number of points contributing to that sum at that time angle. By dividing each value sum by the number of contributing points, it is possible to obtain the average pressure at the determined time interval for each trace. At this point, compensation for displacements of the pen traces to prevent one pen touching the other is done by displacing one vector in time with respect to the other by the amount of time offset (typically five minutes) applicable to the chart recorder type. The flow rate at any point in time is then computed as a chart type constant times the orifice constant times the square root of the product of the manometric pressure and the differential pressure at that time. The time interval for which flow is recorded is the sum of the time intervals for which there exists a non-zero differential pressure. Total flow is the sum of the individually computed flow rates times the time for which flow is recorded. The times of flow, if non-continuous, can be computed with reference to the origin of time referred to above.

The mathematical equations used to produce the differential and manometric pressures and the pressure extension are as follows:

For a particular chart recorder the range of values of the manometric pressure (PF) is from zero to RPF and zero to RHW for the differential pressure (HW).

A constant value Pb must be added to the manometric pressure (PF) in order to transform it into the absolute pressure (PA) with the condition that the manometric pressure (PF) is not equal to zero.

| PA = PF + PB | if PF <> 0 |
| PA = 0 | if PF = 0 |

The calculated value of PF and HW at specific times are converted during the automatic interpretation of the circular chart to the ranges of zero to 100 percent of scale of PF and zero to 100 percent of scale of HW, respectively.

| PF(min) = 0 | PF(max) = RPF |
| HW(min) = 0 | HW(max) = RHW |

Thus, $PF[n](i)$ represents the normalized manometric pressure at time (i) in the range 0 to RPF and its value is n % of RPF; $HW[n](i)$ is the normalized differential pressure at time (i) in the range of 0 to RHW and its value is n % of RHW.

The pressure extension (Z) will be calculated according to the following formulas:

$$Q = \frac{C}{M} \sum_{i=1}^{M} Z(i) = \text{pressure extension}$$

where $Z(i) = \sqrt{PF[n](i)' \times RPF/100 \times HW[n](i+d) \times RHW/100}$ $$Q = C \sqrt{(RPF*RHW)} / (100*M) * \sum_{i=1}^{M} \sqrt{PF[n](i)' * HW[n](i+d)}$$

$PF[n](i)' = PF[n](n) + K$    if $PF[n](i)$ 0

$PF[n](i)' = 0$    if $PF[N](i) = 0$ $K = (PB \times 100)/RPF$

Where:
Q = Volume for time unit.
C = Coefficient.
Z = Pressure Extension.
M = The number of time intervals for which flow rate is non-zero.
d = Chart time displacement of manometric pressure register ahead of the differential pressure.
$PA[n](i)$ = Absolute pressure normalized to the range [0:100] in the time interval.
$PF[n](i)$ = Manometric pressure normalized to the range [0:100] in the time interval.
$HW[n](i)$ = Differential pressure normalized to the range [0:100] in the time interval.
RPF = The range of the manometric pressure.
FHW = The range of the differential pressure.

The process and integrated system of the present invention offers automatic, fast, precise and repeatable measurements of fluid flow rates in flow lines unattainable with previously-known measuring systems. The microprocessor used in the system can be provided with suitable programming and/or module(s) for performing and controlling the various aforementioned calibration, digitizing, editing, image processing, computing and control operations. In addition, the microprocessor can through an information system module be used to record all actions performed by the apparatus to provide, change, or remove any control table or table entry including the physical parameters of the chart recorder, sequence of steps to be automatically performed for specific chart types, geographic locations and descriptions of the flow line monitoring points and the equipment installed therein, as well as descriptive accounts on how to operate or use any apparatus or control feature relating to the operation of the present invention.

The digitizing module used with the microprocessor 24 receives commands from one or more other modules and provides operating parameters to control the resolution and mode of operation of the electronic digitizer 23, in particular in what form the digitized image is to be internally stored and how to communicate portions of the resulting digitized image to the microprocessor. The digitizing module also passes commands to the electronic digitizer 23 for capturing a new image or selecting for display on the monitor 30 either the analogue signal from the camera 14 or the digitized images from its memory.

The editing module interacts with the user and communicates with the digitizing module to modify any image within the memory system. This module permits the elimination from the image of false traces caused by unwanted marks on the subject chart or undesired image points resulting from mathematical operations upon processed images of poor initial quality. The mouse-type pointer 36 can be used as an interaction device to select the location of an erasure and/or the size of the area of erasure. Cursors on the monitors 30 and 32 permit the pointer 36 to indicate a desired operation from alternatives presented on the monitor 32 and to cause the selected operation to affect the image displayed on the monitor 32.

The image processing module examines the matrix form of any selected image and performs mathematical and/or logical operations upon that image or between that image and another selected image in order to produce derived images. Typical operations which are performed include: (1) the partition of an image relative to a selected line or orbit of partition into two new separate images of non-intersecting areas; (2) the pointwise subtraction of the intensity values of one image from those of another to produce a new third image usually used to correct for non-uniform illumination relative to a blank field; (3) the partition of an image relative to a selected intensity value into two new separate images of different intensity ranges; and (4) the logical intersection operation between one image and the logical negation of a second image to produce a new third image which contains no features of the second. The comparison module also interacts with the digitizing module to command the display of the derived images whether under automatic control mode or from instructions by the user.

The computing module examines an image and for every trace point found performs a transformation, to selected limits of resolution, from the cartesian coordinates of that point in the matrix representation of an image to the quasi-polar time-angle versus radial arm displacement coordinates that are followed by the mechanical linkages of the pen arms of chart recorders and counts the number of occurrences of points for each time-angle coordinate and sums the radial displacement values for each point with such time-angle coordinate. The resolution of the time-angle coordinate is selectable and is typically one minute for twenty-four hour charts although other resolutions may be selected. The resolution selected for the radial displacement is typically one half of one percent of full scale, limited by the widths of pen traces normally encountered in monitoring operations with pen recorders. The computing module also calculates the average values of trace displacements for each time interval for which the trace is present by dividing the sum of displacements by the number of contributing points and producing an array of magnitudes with respect to time. Finally, using the computed magnitudes from manometric and differential pressure traces, known physical constants, and known mathematical equations, the computing module computes the individual flows for each time interval and the integral of the flow over the time observed.

The control module permits either manual or automatic operation of the system. If operation is to be manual, the module executes instructions from the user. If operation is to be automatic, the module executes a series of predefined steps. The control module may also be used to cause the interposition and removal of the filter to obtain modified images by providing an appropriate command signal to the filter mechanism control unit 20.

It is to be understood that the invention is not limited to the illustrations described and shown herein, which are determined to be illustrative of the best modes of carrying out the invention and which are susceptible to modification of form, size, arrangement of parts and details of operation. The invention is intended to encompass all such modifications and variations which are within its spirit and scope as defined by the claims.

What is claimed is:

1. A process for continuously monitoring and calculating the flow rate of a fluid medium in a flow line having an orifice plate positioned therein which comprises transcribing a first trace line representing manometric pressure upstream of the orifice and a second line representing differential pressure across the orifice on a chart associated with a recording device, said first and second trace lines having different colors; optically scanning said trace lines and said chart and capturing a first image of said lines and said chart; digitizing said first image; and determining said flow rate of said fluid medium in said flow line by interpreting said digitized first image.

2. A process according to claim 1 wherein said determining step comprises spatially separating said first image by forming a first new derived image with an area external to a desired locus of separation removed and a second new derived image with an area internal to said locus removed and determining said fluid flow rate from said two new derived images of separated traces.

3. A process according to claim 1 wherein said determining step comprises forming two new derived images by partitioning the intensities of said first image with reference to an intensity intermediate between that typical of said first trace line and that typical of said second trace line, one of said new derived images possessing only the higher intensity values, and the other possessing only the lower intensity values and interpreting said images to determine said fluid flow rate.

4. A process according to claim 1 wherein said optical scanning step comprises continually viewing said trace lines and said chart with a video camera.

5. A process according to claim 4 which further comprises calibrating said camera prior to said scanning step, said calibrating step including mounting a test chart on an illuminated base, scanning said test chart with said camera and capturing an image of said test chart, digitizing said captured test chart image, comparing said digitized test chart image with a stored digitized reference image, and adjusting said camera until said test charge image corresponds to said reference image, wherein said adjusting step focuses and positions said camera in three normal directions with respect to a plane of said base and a single point of reference on said base.

6. A process according to claim 4 wherein said determining step further includes altering at least one of the intensity of said trace lines and the apparent color of one of said trace lines to create a modified image, scanning said modified image with said video camera, and digitizing said modified image.

7. A process according to claim 6 wherein said determining step comprises deriving further digitized images by performing mathematical and logical operations on at least one of said first and modified images and determining said fluid flow rate from said derived images.

8. A process according to claim 7 wherein said altering step comprises controlling the intensity of light presented to said camera by adjusting at least one of a lens aperture and overall light level so that when said camera scans said chart a modified image having only one of said trace lines is captured and wherein said determining step comprises forming the logical disjunction of said modified image with said first image to form a new derived image and determining said fluid flow rate from at least one of said modified and derived images.

9. A process according to claim 7 wherein said altering step comprises interposing a color filter between said video camera and said chart so that when said camera scans said chart a modified image having only one of said trace lines is captured and wherein said deriving step comprises forming the logical disjunction of said modified image with said first image to form a new desired image.

10. A process according to claim 9 wherein said determining step further comprises determining said fluid flow rate from at least one of said modified image and said derived image.

11. A process according to claim 7 further comprising providing a video monitor for displaying a selected one of said images and editing said displayed image to eliminate a portion thereof.

12. A process according to claim 11 wherein said editing step comprises manually selecting the portion of the displayed image to be eliminated.

13. A process according to claim 7 which further comprises providing a display monitor and a storage memory; storing said digitized images in said memory; and displaying selected ones of said digitized images on said monitor.

14. A process according to claim 13 which further comprises calibrating said camera prior to said scanning step, said calibrating step comprising mounting a test chart on an illuminated base, viewing the test chart with said camera, displaying said test chart image and a reference image on said monitor, and manually adjusting the camera until the displayed images are colinear.

15. A system for continuously monitoring and calculating the flow rate of a fluid medium in a flow line having an orifice plate positioned therein which comprises: means for transcribing a first line having a first color and representing manometric pressure upstream of the orifice and a second line having a second color and representing differential pressure across said orifice on a chart associated with a recording device; means for optically scanning said trace lines and said chart and for capturing a first image of said lines and said chart; means for digitizing said image; and means for processing said digitized image to obtain said flow rate.

16. A system according to claim 15 wherein said optical scanning means comprises a video camera and said digitizing means comprises an electronic digitizer.

17. A system according to claim 16 further comprising a first video monitor associated with said digitizer for displaying images being digitized.

18. A system according to claim 16 further including means for creating a modified image which can be scanned by said camera and said processing means comprising means for performing mathematical and logical operations on at least one of said first and modified images to derive further images and for determining said fluid flow rate from at least one of said first, modified and derived images.

19. A system according to claim 18 wherein said modified image creating means comprises means for altering at least one of the intensity of said trace lines and the apparent color of one of said trace lines in response to a command from said processing means.

20. A system according to claim 19 wherein said modified image creating means comprises a color filter which can be interposed between said camera and said chart.

21. A system according to claim 19 wherein said processing means comprises a preprogrammed microprocessor and means for manually inputing operational instructions to said microprocessor.

22. A system according to claim 21 further comprising means for editing selected ones of said images.

23. A system according to claim 22 wherein said editing means comprises a second video monitor for displaying an image to be deleted and means for manually interacting with said microprocessor to identify a portion of the displayed image to be deleted.

24. A system according to claim 23 wherein said manual interaction means comprises at least one of a mouse-type pointer and a light pen.

* * * * *